United States Patent
Quintero

(10) Patent No.: US 9,547,105 B2
(45) Date of Patent: Jan. 17, 2017

(54) MULTI-SENSOR WORKFLOW FOR EVALUATION OF GAS FLOW IN MULTIPLE CASING STRINGS

(71) Applicant: Halliburton Energy Services, Inc., Houston, TX (US)

(72) Inventor: Luis F. Quintero, Katy, TX (US)

(73) Assignee: Halliburton Energy Sevices, Inc., Houston, TX (US)

( * ) Notice: Subject to any disclaimer, the term of this patent is extended or adjusted under 35 U.S.C. 154(b) by 0 days.

(21) Appl. No.: 15/111,622

(22) PCT Filed: Sep. 4, 2015

(86) PCT No.: PCT/US2015/048452
§ 371 (c)(1),
(2) Date: Jul. 14, 2016

(87) PCT Pub. No.: WO2016/040136
PCT Pub. Date: Mar. 17, 2016

(65) Prior Publication Data
US 2016/0334539 A1 Nov. 17, 2016

Related U.S. Application Data

(60) Provisional application No. 62/048,462, filed on Sep. 10, 2014.

(51) Int. Cl.
*G01V 5/08* (2006.01)
*G01V 11/00* (2006.01)
(Continued)

(52) U.S. Cl.
CPC ......... *G01V 11/002* (2013.01); *E21B 47/0005* (2013.01); *E21B 47/065* (2013.01); *G01V 5/102* (2013.01)

(58) Field of Classification Search
CPC .......... E21B 47/00; E21B 47/10; E21B 47/01; E21B 47/09; G01V 5/04; G01V 1/40; G01V 11/00; G01V 5/10
(Continued)

(56) References Cited

U.S. PATENT DOCUMENTS

| 2003/0009288 A1 | 1/2003 | Mickael |
| 2009/0044617 A1 | 2/2009 | DiFoggio |

(Continued)

FOREIGN PATENT DOCUMENTS

| WO | WO2016040134 | * | 9/2015 | ............. E21B 47/10 |
| WO | WO2016040140 | * | 9/2015 | ............. E21B 27/00 |
| WO | 2016040136 A1 | | 3/2016 | |

OTHER PUBLICATIONS

The United States Court of Appeals for the Federal Circuit decision (Aug. 1, 2016) in the *Electric Power Group, LLC*, v. *Alstom S.A.* case.*

(Continued)

*Primary Examiner* — David Porta
*Assistant Examiner* — Meenakshi Sahu
(74) *Attorney, Agent, or Firm* — McDermott Will & Emery LLP; Benjamin Fite

(57) ABSTRACT

A distance of a gas flow path and a velocity of the gas flow therein are calculated using pulsed neutron data and noise data. The gas saturation and distance to flow path obtained from the pulsed neutron data and gas velocity and distance to flow path obtained from the noise data are compared with each other to obtain a first calculated distance and a first calculated velocity. The distance and the velocity of the gas flow are calculated using Doppler data. The distance and velocity values are compared with the first calculated distance and first calculated velocity to obtain a second calculated distance and velocity values. The distance and the (Continued)

velocity of the gas flow are calculated using temperature data. The distance and velocity values are compared with the second calculated distance and velocity to determine a distance of a cement interface and a velocity of a gas flow therein.

19 Claims, 8 Drawing Sheets

(51) Int. Cl.
    *G01V 5/10*     (2006.01)
    *E21B 47/00*     (2012.01)
    *E21B 47/06*     (2012.01)

(58) Field of Classification Search
    USPC .................................................. 250/269.2
    See application file for complete search history.

(56) References Cited

U.S. PATENT DOCUMENTS

| 2010/0226206 A1 | 9/2010 | Al-Khamis |
| 2011/0192598 A1 | 8/2011 | Roddy et al. |
| 2013/0075091 A1 | 3/2013 | Hallundbæk |
| 2016/0202387 A1* | 7/2016 | Fox ................ E21B 47/0005 |
| | | 73/152.58 |

OTHER PUBLICATIONS

International Search Report and Written Opinion for PCT/US2015/048452 dated Nov. 25, 2015.
TMD3D™ (Thermal Multigate Decay—3 Detector) Logging Tool Data Sheet, 2014.
Reservoir Monitor (RMT™ i) Tool Data Sheet, 2014.

* cited by examiner

MULTI-SENSOR WORKFLOW FOR EVALUATION OF GAS FLOW IN MULTIPLE CASING STRINGS

CROSS-REFERENCE TO RELATED APPLICATIONS

This application claims priority under 35 U.S.C. §119 to Provisional Application No. 62/048,462 filed on Sep. 10, 2014, in the United States Patent and Trademark Office.

BACKGROUND

Completing an oil or gas well includes a cementing procedure that bonds one or more well casings lining a wellbore to a surrounding subterranean formation and between each other. In the vast majority of cases, as the well deepens, new casing strings are needed and cemented in place. Many other factors can also indicate the need for multiple concentric or overlapping casing strings, such as compliance with environmental and safety policies. In general, the cement between these casing strings prevents the presence or movement of fluids within the annular spaces defined between overlapping casings and between the casing and the wellbore wall. In some wells, the cementing process extends from total depth to surface, while in others the cement is present only between certain depths.

Of particular importance is the determination of the presence of fluid flow paths in the annular regions defined between overlapping casings and between the casing and the wellbore wall due to an absence of cement (or cement bond) at or between certain depths. The identification and characterization of these flow paths is particularly critical in the case of plug and abandonment operations, especially in deep water applications.

Sonic tools or ultrasonic tools are typically used in the industry to evaluate the cement bonding to both the formation and the casing and hence infer potential annular flow paths (i.e., leaks, channels, gaps, etc.). The evaluation in most of these cases uses raw data from only one system of sensors to infer fluid flow parameters through indirect methods. There is no current workflow method that integrates the various measurements obtained into a borehole model. Current methods are also typically used for the characterization of the first casing-cement bond, thereby precluding the evaluation of any subsequent interfaces in the case of multiple casing strings extended within the well.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

The present disclosure is related to the field of production of hydrocarbons from wellbores and, more particularly, to methods of evaluating annular flow of gas between multiple casing strings that line a wellbore.

The present disclosure describes integrated workflow methods that indicate the location of gas and the rate at which it flows between concentric casings in a wellbore. The methods and systems described herein are applicable in wellbores lined with multiple casing strings and use pulsed neutron, noise, Doppler, and temperature sensors. Those skilled in the art will readily appreciate that the embodiments described herein provide advanced methods of evaluating and characterizing cement sheaths without requiring an investment in new tools, new tool hardware, or adaptations of existing tools.

Figure 1:
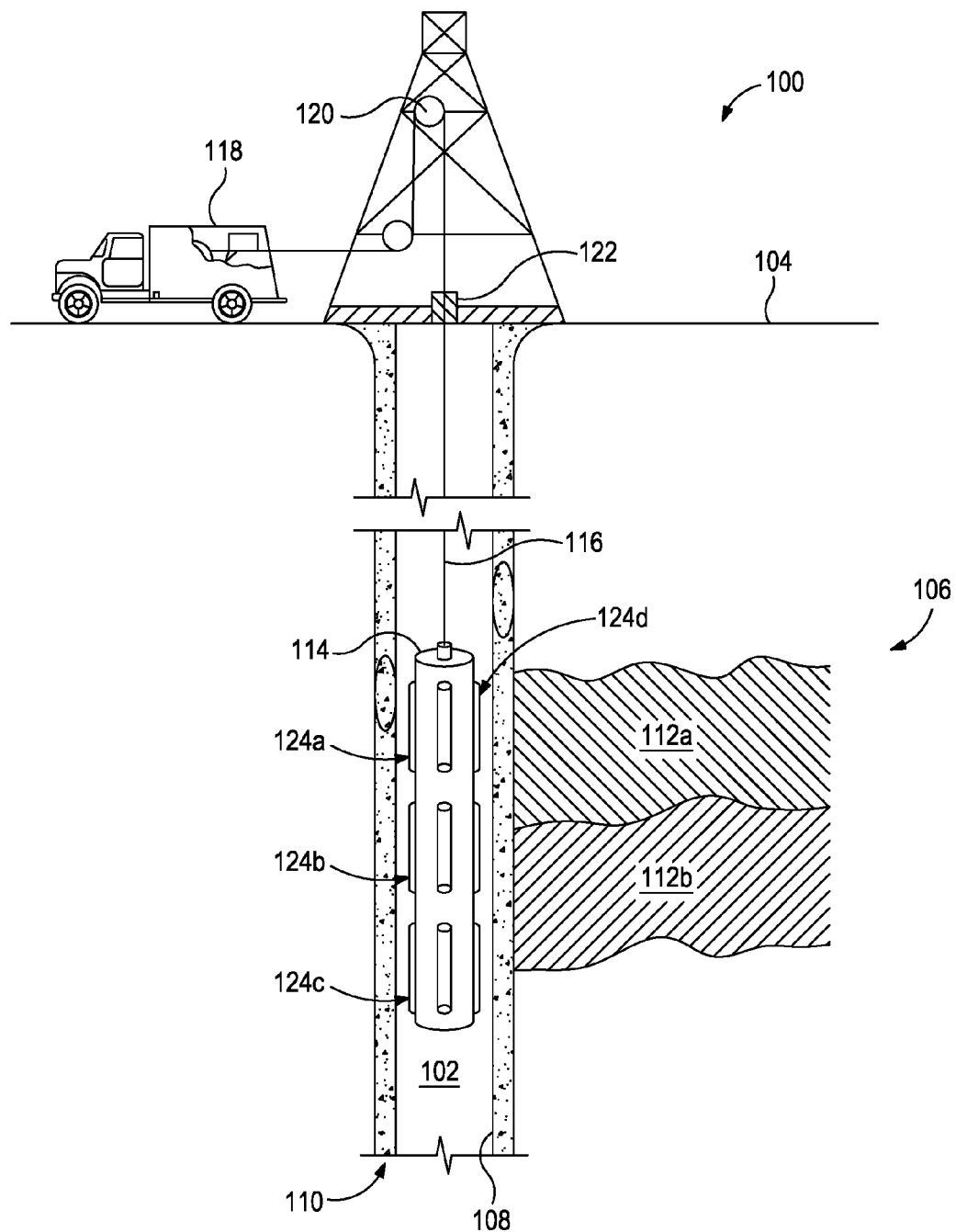
FIG. 1 is a well system that can employ the principles of the present disclosure.

Referring to FIG. 1, illustrated is an exemplary well system 100 that may employ the principles of the present disclosure. As illustrated, a wellbore 102 has been drilled from a surface location 104 into a subterranean formation 106 containing hydrocarbons entrained therein. Set within the wellbore 102 is at least one string of casing 108 bonded to the inner wall of the wellbore 102. While not shown, multiple strings of casing 108 may be positioned within the wellbore 102, where axially adjacent casings 108 overlap each other a short distance.

The casing 108 is bonded within the wellbore 102 by adding cement 110 within the annulus formed between the outer diameter of the casing 108 and the inner diameter of the wellbore 102. The resulting cement bond not only adheres the casing 108 within the wellbore 102, but also serves to isolate adjacent zones (112a and 112b) within the formation 106 from one another. Isolating the adjacent zones 112a,b can be important when one of the zones 112a,b contains oil or gas and the other zone includes a non-hydrocarbon fluid, such as a gas. Should the cement 110 surrounding the casing 108 be defective and fail to provide isolation of the adjacent zones 112a,b, gas or other undesirable fluids can migrate into the hydrocarbon producing zone thus diluting or contaminating the hydrocarbons within the producing zone. The cement bond also serves to bond axially adjacent casings 108 that overlap each other a short distance.

To detect possible defective cement bonds between the casing 108 and the wellbore 102 and between overlapping lengths of casing 108, a tool string 114 may be introduced into the wellbore 102 on a conveyance 116, such as wireline or slickline. Other suitable conveyances can include, however, drill pipe, coiled tubing, a downhole tractor, production tubing, and the like. In some embodiments, the conveyance 116 may be connected to a surface processing unit 118, which in FIG. 1 is depicted as a truck via a pulley system 120 and fed into the wellbore 102 via a wellhead installation 122, such as a lubricator or the like. The tool string 114 may include one or more wireline logging tools or sensors developed for analyzing the integrity of the cement 110 bonding the casing 108 to the wellbore 102 and/or to a portion of an overlapping casing. For instance, the tool string 114 may include wireline logging tools and/or sensors such as, but not limited to, a pulsed neutron sensor 124a, a noise sensor 124b, a Doppler sensor 124c, and a temperature sensor 124d.

Figure 2:
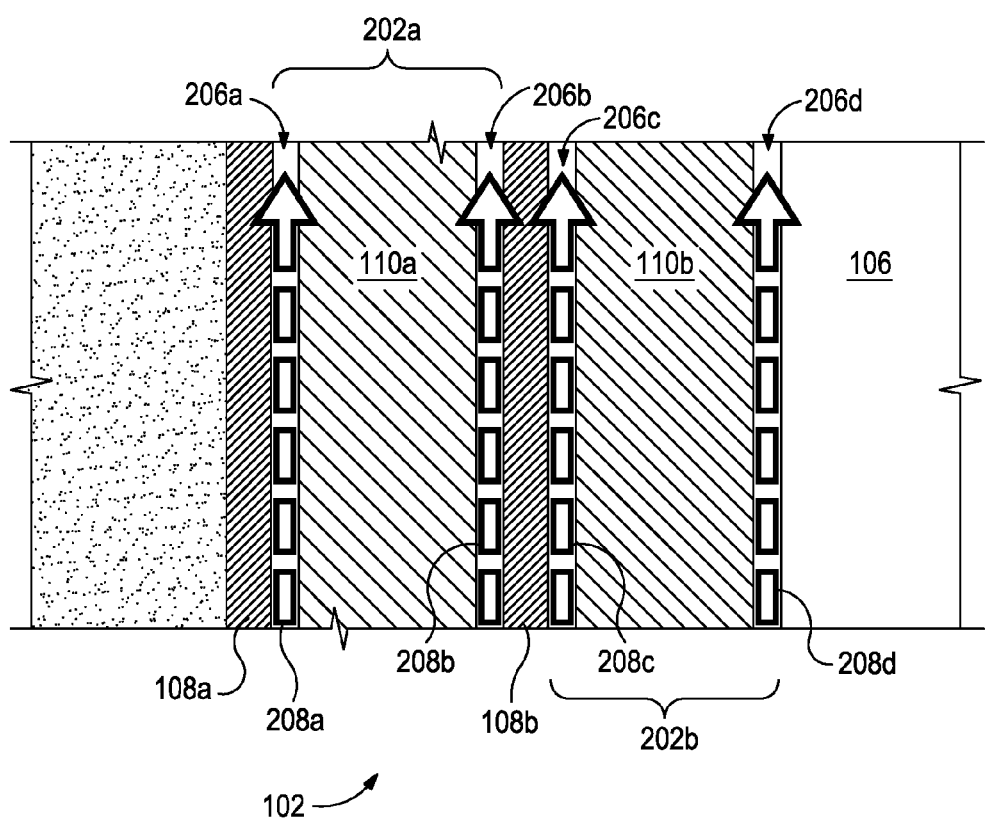
FIG. 2 depicts an enlarged cross-sectional view of a portion of the wellbore of FIG. 1.

FIG. 2 depicts an enlarged cross-sectional view of a portion of the wellbore 102 of FIG. 1 lined with a first casing 108a and a second casing 108b. A first cement layer 110a is disposed within a first annulus 202a defined between the outer diameter of the first casing 108a and the inner diameter of second casing 108b. A second cement layer 110b is disposed within a second annulus 202b defined between the outer diameter of the second casing 202 and the formation 106. The first and second cement layers 110a,b disposed within the first and second annuli 202a,b, respectively, bond the first and second strings of casing 108a,b to the surrounding formation 106 and to each other.

A first cement interface 206a is provided at the outer diameter of the first casing 108a and the first cement layer 110a. A second cement interface 206b is provided at the inner diameter of the second casing 108b and the first cement layer 110a. A third cement interface 206c is provided at the outer diameter of the second casing 108b and the second cement layer 110b, and a fourth cement interface 206d is provided at the inner diameter of the formation 106 and the second cement layer 110b. FIG. 2 also depicts one or more potential interface flow paths 208 (shown as interface flow paths 208a, 208b, 208c, and 208d), each formed due to gaps between the first and second casings 108a,b and the adjoining cement layers 110a,b or between the cement layer 110b and the formation 106. A fluid, such as gas, may be able to traverse one or more of the various interface flow paths 208a-d. According to the present disclosure, the wireline logging tools or sensors of the tool string 114 (FIG. 1) may be used to identify and characterize cement interfaces 206a-d and thereby determine if there is any gas flow at the interface flow paths 208a-d.

In operation, and in an integrated workflow method, the tool string 114 including the pulsed neutron sensor 124a may be lowered to a desired depth generally along the center of the wellbore 102. High-energy neutrons are emitted by a neutron source (not expressly illustrated) located on the tool string 114 into the wellbore 108 and the formation 106. Because gas has low density, there are relatively fewer collisions between the gas molecules and the neutrons, and a relatively higher number of neutrons are received back by the pulsed neutron sensor. From the number of neutrons received, a count rate (e.g., number of neutrons received per unit time) of the neutrons is obtained.

The pulsed neutron sensor 124a may generate a pulsed neutron log from the count rate. The pulsed neutron log may be analyzed to obtain pulsed neutron log (PNL) data including a gas saturation value within the radius of investigation of the pulsed neutron sensor 124a. The gas saturation is provided to a model that determines (or predicts) the location of the gas (or the gas zone) in the wellbore 102 (for instance, in one or more interface flow paths 208a-d) and the radial distance of the gas zone from center of the wellbore 102 (or, alternatively, the radial distance from the tool string 114).

It should be noted that the count rate also can be used to make an initial determination whether water or gas is present in the interface flow paths 208a-d defined by the first casing 108a and the second casing 108b. As is known, the neutron absorption in water is much higher than in gas. Therefore, if the count rate is high, it can then be determined that gas is present. However, if the count rate is small, then it can be determined that water is present in the wellbore 108.

Figure 3:
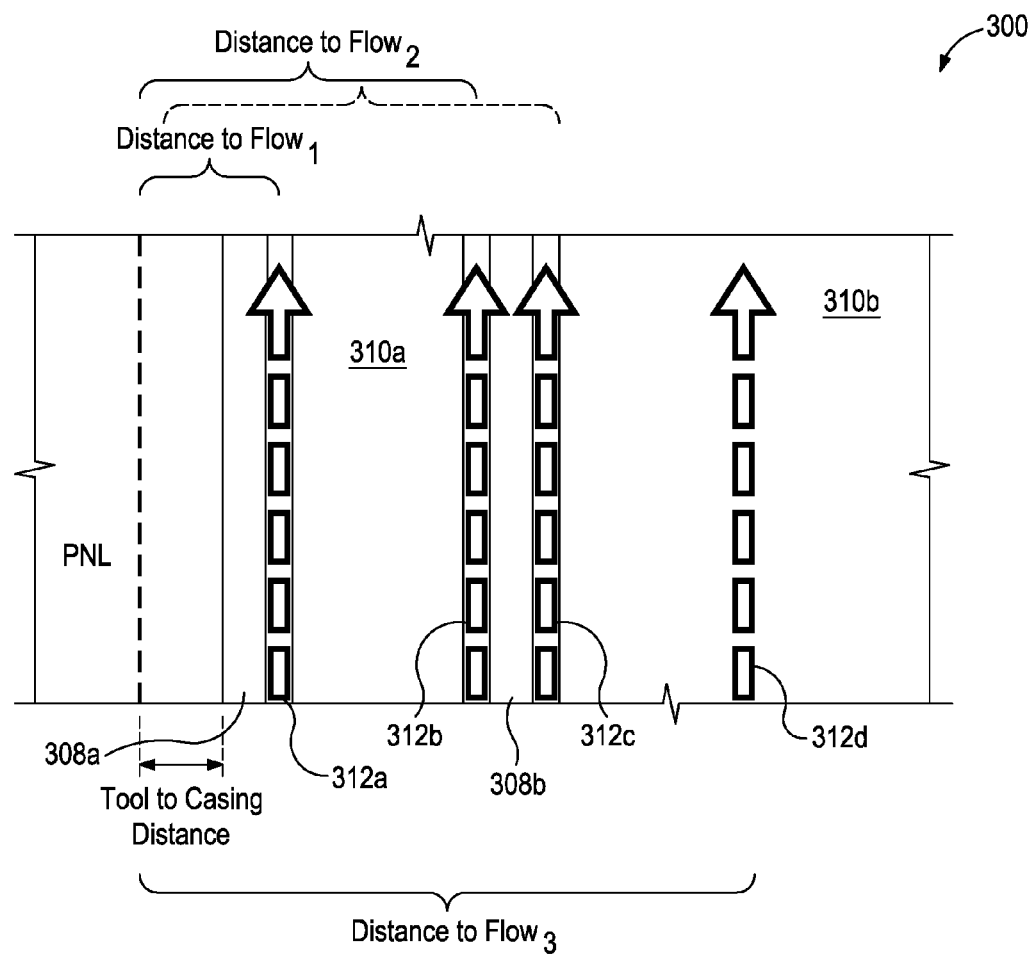
FIG. 3 illustrates is a semi-descriptive borehole model derived from data obtained from the pulsed neutron sensor of FIG. 1.

FIG. 3 illustrates an exemplary semi-descriptive static borehole model 300 derived from pulsed neutron log (PNL) data obtained from the pulsed neutron sensor 124a (FIG. 1). As used herein, the term "semi-descriptive borehole model" indicates that the model (for instance, a mathematical model) may not be an exact representation of the wellbore, but characterizes the wellbore with a level of accuracy adequate for determining any gas presence in the wellbore. Also, the measurement obtained from the pulsed neutron sensor is considered a static measurement since the PNL data determines the saturation of gas that does not have to be flowing.

The PNL borehole model 300 characterizes the wellbore 102, and, when provided with the PNL data, determines (or predicts) the presence of gas in the wellbore 102 within the radius of investigation and the radial distance of the gas zone from center of the wellbore 102. For instance, as illustrated, the model 300 characterizes the wellbore 102 as being lined with a first casing 308a and a second casing 308b. The first casing 308a may characterize the first casing 108a (FIG. 1) and the second casing 308b may characterize the second casing 108b (FIG. 1). A first region 310a, representing the first cement layer 110a (FIG. 2), is defined between the first casing 308a and the second casing 308b. A second region 310b may be defined adjacent the second casing 308b. The second region 310b may collectively represent the second cement layer 110b and the formation 106 in FIG. 2.

The pulsed neutron sensor 124a cannot distinguish between the second cement layer 110b (FIG. 2) and the formation 106 (FIG. 2) if no gap is present or if the well is shut-in. In other words, the pulsed neutron sensor 124a may not be able to determine the presence of the fourth interface 206d (FIG. 2) if no gap is present or if there is no gas present in the gap while the measurement is taking place. However, if the flow path 208d (FIG. 2) is present and includes gas, the fourth interface 206d may be detected by the pulsed neutron sensor 124a, and, as a result, the model 300 is able to characterize the fourth interface 206d and the presence of gas in the corresponding flow path 312d.

From the PNL data obtained, the model 300 predicts the presence of the gas in one or more flow paths 312a-d and the radial distance of the gas. It should be noted that, due to the limitation in the resolution, the pulsed neutron sensor 124 may not distinguish the flow path 312b (at the interface 206b, FIG. 2) from the flow path 312c (at the interface 206c, FIG. 2). Thus, the model 300 assumes the flow paths 312b,c to be at the same radial distance from the center of the wellbore 102. It will be understood that the number of flow paths illustrated in FIG. 3 is merely an example and the number of flow paths may increase or decrease depending on the PNL data provided to the model 300.

The noise sensor 124b of FIG. 1 may be configured to "listen" to the noise generated due to the gas flow in the one or more flow paths 312a-d, and generate a corresponding noise log. The noise log may be analyzed to obtain noise log data including an amplitude of a noise signal generated by each of the one or more gas flows, a frequency spectrum of the noise signals generated, a relative phase shift between the noise signals, frequency ratios of the near and far noise signals, and power spectral density of the noise signals. The amplitude and frequency information obtained may be provided to a borehole model that determines (or predicts) the velocity of the gas in each flow path 312a-d determined to be present in the wellbore and the radial distance of each flow path from the center of the wellbore 102 (or, alternatively, the radial distance from the tool string 114).

Figure 4:
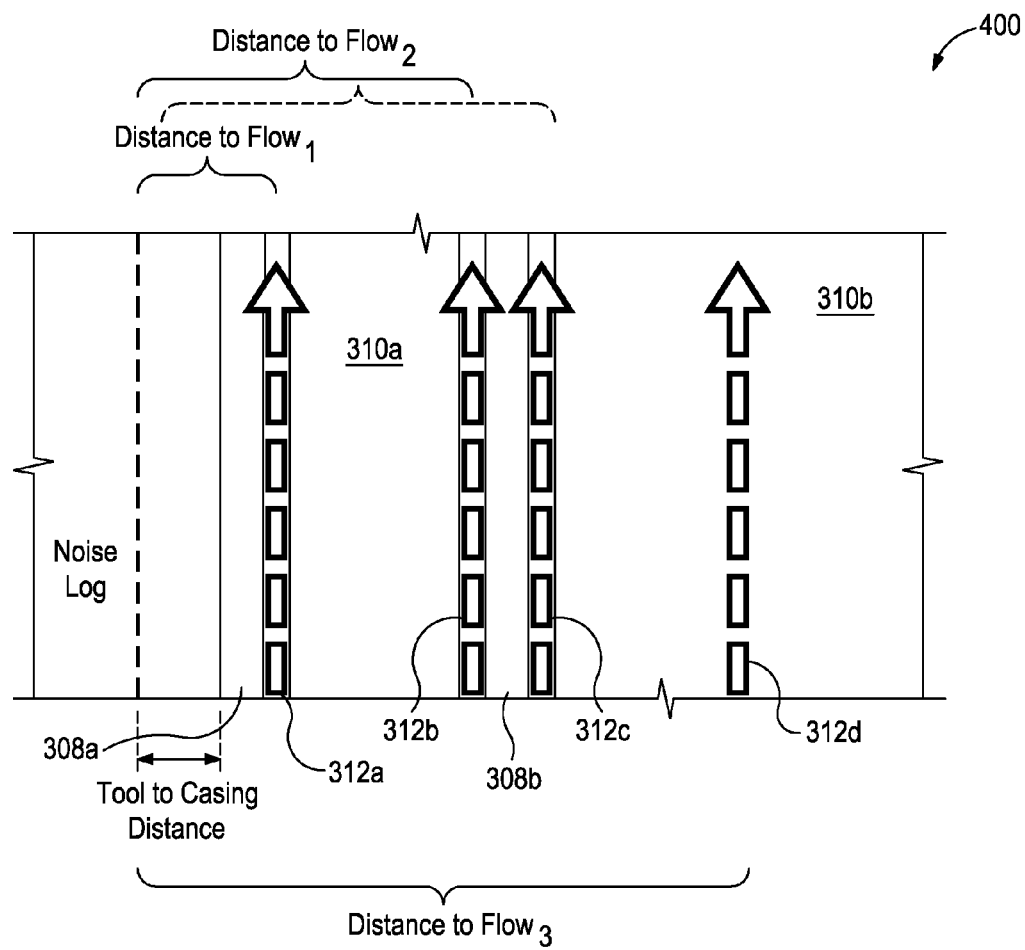
FIG. 4 illustrates a semi-descriptive borehole model derived from data obtained from the noise sensor of FIG. 1.

FIG. 4 illustrates an exemplary semi-descriptive dynamic borehole model 400 derived from noise log (NL) data obtained from the noise sensor 124b of FIG. 1. The measurements obtained from the noise sensor 124b are referred to as dynamic measurements because the measurements are obtained from gas that is flowing. The noise sensor 124b and the pulsed neutron sensor 124a obtain measurement data from the same wellbore 102 and at approximately the same distance. Accordingly, similar physical phenomena (the gas flow or gas presence, in this case) are measured by the pulsed neutron sensor 124a and the noise sensor 124b at similar distances. Further, the pulse neutron sensor 124a and the noise sensor 124b may each have similar resolution limitations and similar depth of investigation. As a result, the noise log borehole model 400 may be similar in some respects to the model 300 in FIG. 3, and therefore may be best understood with reference thereto where like numerals designate like components not described again in detail. The model 400 may characterize the wellbore 102, and, when provided with the NL data, may predict the velocity of the gas flow in the one or more flow paths 312a-d and the radial distance of the gas flow from the center of the wellbore 102.

The model 400 may determine the radial distance from the amplitude information. For instance, the amplitude of a noise signal generated by a gas flow close to the noise sensor 124b is larger than the amplitude of a noise signal generated by a gas flow further away from the noise sensor 124b. From the frequency information, the model 400 predicts the width of the flow path through which the gas flows, and the velocity of the gas flow. For instance, a higher frequency may indicate a flow path 312a-d having a smaller width and gas flowing with a higher velocity, and a lower frequency may indicate a flow path 312a-d have a larger width and gas flowing with a relatively smaller velocity.

Accordingly, based on the NL data provided, the model 400 determines the radial distance of the one or more flow paths 312a-d and the velocity of the gas flow in each of the flow paths 312a-d. Since the measurement by the noise sensor 124b is a dynamic measurement, the noise sensor 124b cannot distinguish between the second cement layer 110b (FIG. 2) and the formation 106 (FIG. 2) if no gap is present or if the well is shut-in. In other words, the noise sensor 124b may not be able to determine the presence of the fourth interface 206d (FIG. 2) if no gap is present or if there is no gas flow in the gap while the measurement is taking place. However, if the flow path 208d is present and the gas is flowing, the fourth interface 206d may be detected by the noise sensor 124b, and, as a result, the model 400 is able to characterize the fourth interface 206d and the gas flow 312d. It will be understood that the number of flow paths illustrated in FIG. 4 is merely an example, and the number of flow paths 312a-d may be more or less depending on the NL data provided to the model 400.

The velocity of the gas flow in one or more flow paths 312a-d and the radial distance of the gas flow as predicted by the model 400 are correlated with the gas saturation in one or more flow paths 312a-d and the radial distance of the gas as predicted by the model 300. The predictions from the models 300 and 400 may be determined to conform to each other when their values lie within the margin of error of each other. When the predictions conform to each other, the gas velocity as predicted by the model 400 may be determined to be in accordance with the gas saturation as predicted by the model 300. For instance, based on the measured frequency and amplitude of the noise generated due to the gas flow, the gas flow may be assumed to be present at a certain distance. Based on the gas saturation, a certain width of the flow path that would create the measured frequency and amplitude of the noise is then assumed. The above parameters may be re-calculated or refined based on an iterative calculation process (and also may be re-calculated or refined based on the predictions obtained from the other models, detailed below). When these parameters are in accordance with each other (and with the predictions from the other models), then the predictions from the models 300 and 400 may be determined to conform to each other. If the predictions do not conform, the model 300 and/or the model 400 may be updated. Updating the models 300, 400 may entail recalculating one or more of the gas saturation, the velocity of the gas flow in each flow path 312a-d, and the radial distance of the gas in the flow paths 312a-d. The process may be repeated iteratively until predictions by the models 300 and 400 conform to each other, thereby resulting in first calculated values of the velocity of each gas flow and the radial distance of each flow path 312a-d. From the above, it will thus be understood that the characterization of the flow paths 312a-d in FIGS. 3 and 4 by the respective models 300, 400 may be subject to change based on the above-mentioned comparison operation and the subsequent calculations performed by the models 300 and 400.

The Doppler sensor 124c of FIG. 1 may be configured to emit an acoustic wave, which is modified due to interaction with the formation 106 and the wellbore 102. The Doppler sensor 124c may receive the modified acoustic wave and generate a corresponding Doppler log. The Doppler log may be analyzed to obtain Doppler log data including the amplitude and frequency of the modified acoustic wave, and the frequency shift between the emitted acoustic wave and the modified acoustic wave. The Doppler log data may be provided to a borehole model that determines (or predicts) the velocity of the gas flow in each flow path determined to be present in the wellbore 102 and the radial distance of each flow path from center of the wellbore 102 (or, alternatively, the radial distance from the tool string 114). It should be noted that wellbore measurements using the Doppler sensor 124c may be used to confirm the presence of gas. This is because, negligible Doppler effect is observed in gas, and, therefore the acoustic wave may be modified minimally and the Doppler frequency shift observed may be minimal. If, however, a relatively greater Doppler frequency shift is observed, it may be determined that water is present in the wellbore.

Figure 5:
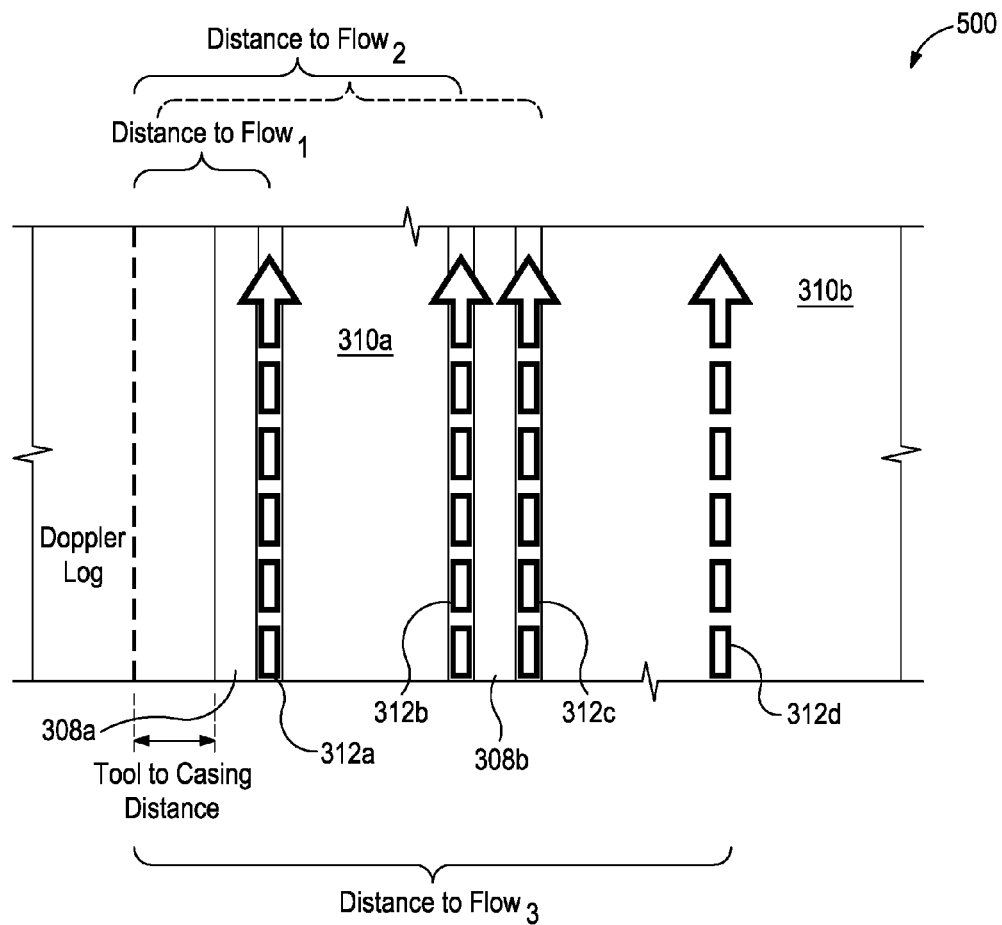
FIG. 5 illustrates a semi-descriptive borehole model derived from data obtained from the Doppler sensor of FIG. 1.

FIG. 5 illustrates an exemplary semi-descriptive borehole model 500 derived from Doppler log data obtained from the Doppler sensor 124c of FIG. 1. The measurements obtained from the Doppler sensor are referred to as dynamic measurements since Doppler effect can be seen only when the gas is flowing. Like the pulsed neutron sensor 124a and the noise sensor 124b, the Doppler sensor 124c also obtains measurement data from the same wellbore 102 at approximately the same distances as the pulsed neutron sensor 124a and noise sensor 124c. Accordingly, similar physical phenomena (the gas flow or gas presence, in this case) are measured by the pulsed neutron sensor 124a, the noise sensor 124b, and the Doppler sensor 124c at similar distances. Further, the pulse neutron sensor 124a, the noise sensor 124b, and the Doppler sensor 124c may each have similar resolution limitations and similar depth of investigation. As a result, the Doppler borehole model 500 may be similar in some respects to the models 300 and 400 in FIGS. 3 and 4, respectively, and therefore may be best understood with reference thereto where like numerals designate like components not described again in detail.

Similar to the model 400, the model 500 may characterize the wellbore 102 and, when provided with the Doppler log data obtained from the Doppler sensor 124*c*, may predict the velocity of gas flow in each flow path 312*a-d* and the radial distance of each flow path 312*a-d* from the center of the wellbore 102. Since the measurement by the Doppler sensor 124*c* is a dynamic measurement, the Doppler sensor 124*c* cannot distinguish between the second cement layer 110*b* (FIG. 2) and the formation 106 (FIG. 2) if no gap is present or if the well is shut-in. In other words, the Doppler sensor 124*c* may not be able to determine the presence of the fourth interface 206*d* (FIG. 2) if no gap is present or if there is no flow in the gap while the measurement is taking place. However, if the flow path 208*d* is present and the gas is flowing, the fourth interface 206*d* may be detected by the Doppler sensor 124*c*, and, as a result, the model 500 is able to characterize the fourth interface 206*d* (FIG. 2) and the gas flow 312*d*. It will be understood that the number of flow paths 312*a-d* illustrated in FIG. 5 is merely an example, and the number of flow paths 312*a-d* may be more or less depending on the Doppler log data provided to the model 500.

A comparison is performed, wherein the velocity of the gas flow in each flow path 312*a-d* and the radial distance to each flow path 312*a-d* as predicted by the model 500 are compared with the first calculated values of the velocity of the gas flow in each flow path 312*a-d* and the radial distance of the flow paths 312*a-d*. If the predictions by the model 500 do not match the first calculated values of velocity of the gas flow in each flow path 312*a-d* and the radial distance of the flow paths 312*a-d*, one or more of the models 300, 400, and 500 may be updated. Updating the models 300, 400, and 500 may entail recalculating one or more of the gas saturation, the velocity of the gas flow in each flow path 312*a-d*, and the radial distance of the flow paths 312*a-d*. The process repeats iteratively until the first calculated values of the velocity and the radial distance of the gas flow match the velocity and the radial distance of the gas flow obtained by the model 500, thereby resulting in second calculated values of the velocity of gas flow and the radial distance of each flow path 312*a-d*. From the above, it will thus be understood that the characterization of the flow paths 312*a-d* in FIGS. 3, 4, and 5 by the respective models 300, 400, and 500 is subject to change based on the above-mentioned comparison operation and the subsequent calculations performed by the models 300, 400, and 500.

The wellbore 102 may be characterized using a static borehole model. The static borehole model is constructed based on a completed wellbore 102 and includes data obtained from drilling and completion operations, log analysis, cuttings, casing specifications, cement specifications, bit size, caliper, tubing size, formation properties—lithology, porosity, gas saturation, water saturation, etc., acoustic impedance of the casing and cement, heat capacity of the casing and cement, noise and temperature conduction in the casing, cement, and formation, specific velocity of sounds in casing, cement, and formation, and the like. Using the static borehole model, a temperature borehole model is obtained. The temperature borehole model is provided with temperature data obtained using the temperature sensor 124*d*.

The temperature sensor 124*d* obtains the temperature of the formation 106 and the wellbore 102, and creates temperature profile based on the obtained temperature information. The measurements performed by the temperature sensor are considered as pseudo-dynamic measurements, since these measurements are obtained based on gas that was flowing in the past and may be not be flowing at the time of measurement. The temperature profile includes a variation in the temperature due to one or more gas flows at the time of measurement and temperature variations due to one or more gas flows that occurred during a predetermined time interval in the past. This predetermined time interval may occur any time between the plug and abandonment operation of the well and the time the temperature is measured. The temperature variations may be caused due to a higher temperature gas flow from a downhole location. For instance, since temperature in the sub-surface increases with depth, gas flowing from a downhole location to an uphole location will increase the temperature at the uphole location. Further, heat will be generated due to friction of the gas flow with the surroundings, which will also contribute to the temperature increase. From the temperature profile, temperature data including the temperature value at a given depth (e.g., the amplitude of the temperature profile at a given time), the temperature gradient (the rate of increase in temperature with depth), and a derivative of the temperature profile may be obtained.

The temperature data may be provided to a temperature borehole model that determines (or predicts) the velocity of the gas flow in each flow path 312*a-d* determined to be present in the wellbore 102 and the radial distance of each flow path 312*a-d* from the center of the wellbore 102 (or, alternatively, the radial distance from the tool string 114). The temperature borehole model may be similar to any one of the above-disclosed models 300, 400, and 500, and the operation thereof may be understood with respect to the operation of any of the models 300, 400, and 500, as disclosed above. However, unlike the model 300, 400, 500, the temperature borehole model is able to characterize the fourth interface 206*d* (FIG. 2) and the gas flow 208*d* (FIG. 2) even when the measurement is conducted with the well shut-in. This is because, from the temperature profile and the static borehole model, the temperature borehole model may determine that any temperature variation detected while the well is shut-in, but not detected either because the variation is occurring beyond the depth of investigation of the pulsed neutron sensor 124*a*, the noise sensor 124*b*, and the Doppler sensor 124*c*, or because the variation occurred while the gas was flowing, has to be occurring due to a presence of a gas flow at the fourth interface 206*d*.

The velocity of the gas flow and the radial distance to each flow path as predicted by the temperature borehole model are compared with the second calculated values of the velocity of gas flow and the radial distance of each flow path 312*a-d*. If the predictions by the temperature borehole model do not match the calculated values of the velocity of the gas flow in each flow path and the radial distance of the flow paths, one or more of the models 300, 400, 500, and the temperature borehole model may be updated. Updating the models 300, 400, 500, and the temperature borehole model may entail recalculating one or more of the gas saturation, the velocity of the gas flow in each flow path, and the radial distance of the flow paths. The process repeats iteratively until the second values of the velocity and the radial distance of the gas flow match the velocity and the radial distance of the gas flow obtained by the temperature borehole model, thereby resulting in the widths of the flow paths 312*a-d* at the cement interfaces 206*a-d*, the velocity of the gas flow in each of the flow paths 312*a-d*, and the radial distance to the gas flow.

Figure 6:
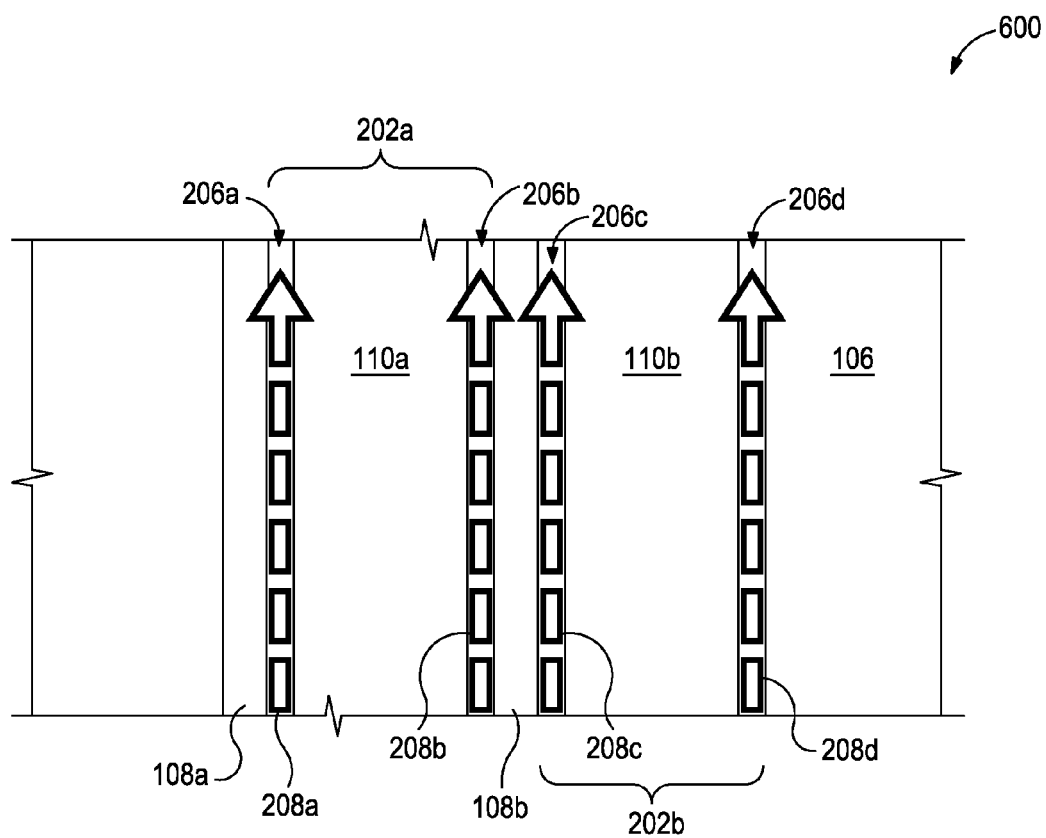
FIG. 6 denotes the borehole model derived from an integrated workflow method.

FIG. 6 illustrates a resultant static and dynamic borehole model 600 derived from the above-described integrated workflow method for evaluating annular flow of gas between multiple casing strings. The borehole model 600 may be best understood with reference to FIG. 2, where like numerals designate like components not described again in detail. The borehole model 600 may be a descriptive model since the borehole model 600 may be a near exact representation of the wellbore 102 illustrated in FIG. 2. Using the borehole model 600, for example, it may thus be possible to determine the widths of the flow paths 208*a*-*d* at the cement interfaces 206*a*-*d*, the velocity of the gas flow in each of the flow paths 208*a*-*d*, and the radial distance to the gas flow with relatively high accuracy.

Figure 7:
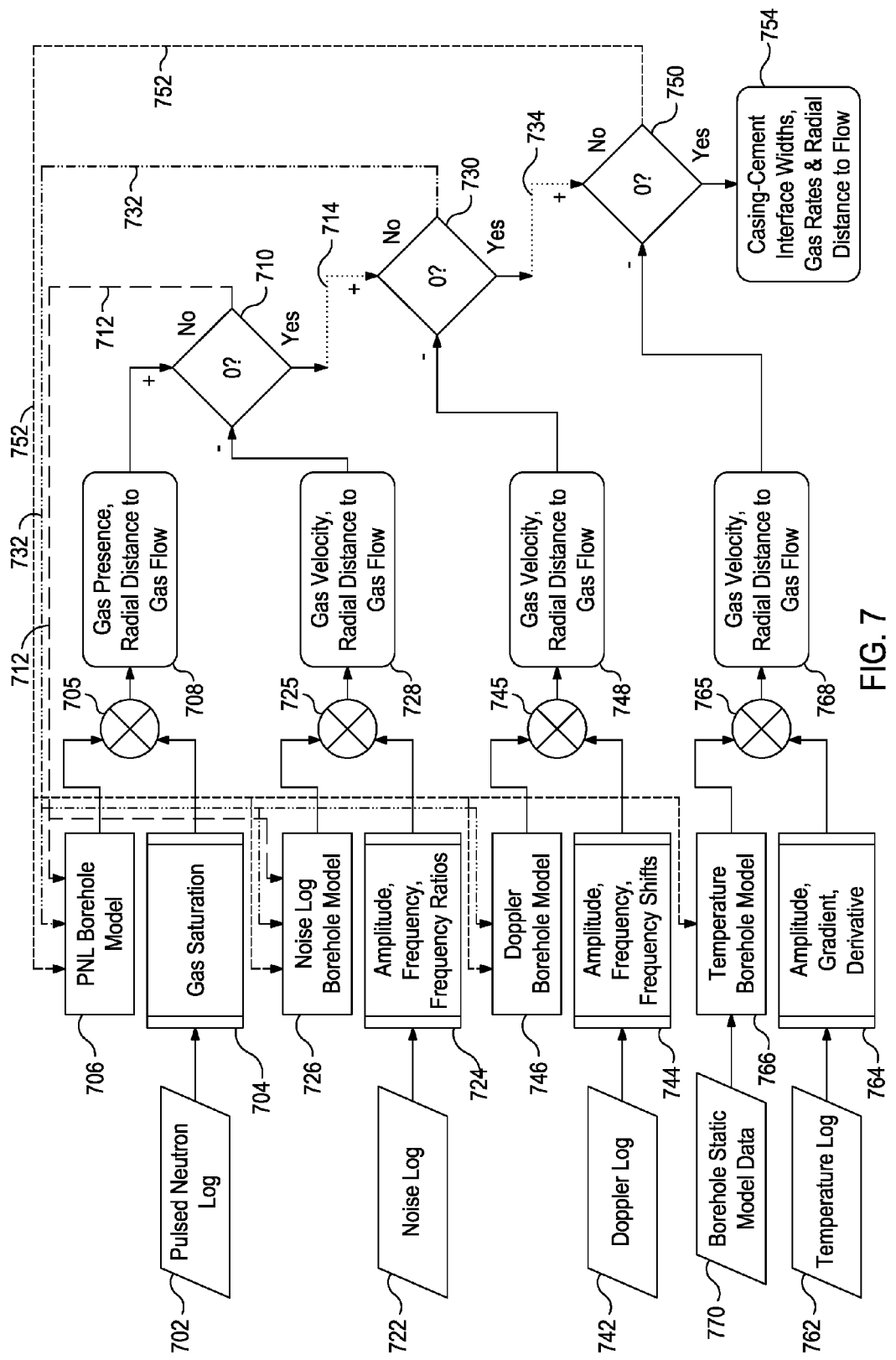
FIG. 7 is a flowchart schematic of an exemplary workflow method to identify and characterize fluid flow at cement interfaces in a wellbore.

FIG. 7 is a flowchart schematic of an exemplary integrated workflow method 700 for determining gas presence, the radial distance to the gas zone, and the velocity of the gas flow in a wellbore. It should be noted that methods consistent with the present disclosure may include at least some, but not all of the activities illustrated in method 700, performed in a different sequence. The integrated workflow method 700 may incorporate and otherwise make use of the PNL borehole model 300, the noise log borehole model 400, the Doppler borehole model 500, and the temperature borehole model described herein.

The method 700 may include obtaining a Pulsed neutron log (PNL) from the pulsed neutron sensor 124*a* (FIG. 1), as at 702. The method 700 then obtains (e.g., via deconvolution) PNL data including an amount of gas saturation in the wellbore, as at 704. As at 705, the PNL data is provided to a PNL borehole model (obtained at 706). The PNL borehole model may be similar to or the same as the model 300 illustrated in FIG. 3, and, when provided with the PNL data, the PNL borehole model predicts the presence of gas in one or more flow paths as characterized by the PNL borehole model and a first radial distance of the flow paths from center of the wellbore 102, as at 708.

A noise log (NL) is obtained from the noise sensor 124*b* (FIG. 1), as at 722. The method 700 then obtains (e.g., via deconvolution) NL data including one or more of the amplitudes of the noise signals, a frequency spectrum of the noise signals, a relative phase shift between the noise signals, frequency ratios of the near and far noise signals, and power spectral density of the noise signals, as at 724. The method 700 provides a noise log borehole model, as at 726. The noise log borehole model may be similar to the model 400 illustrated in FIG. 4, and is provided the NL data, as at 725. Based on the NL data, the noise log borehole model determines a second radial distance of the one or more flow paths having gas from center of the wellbore 102 and a first velocity value of the gas flow in the one or more flow paths, as at 728.

At 710, the gas saturation and the first radial distance of the flow paths are correlated with the second radial distance of the flow paths and the first velocity value. If gas saturation and the first radial distance predicted by the PNL borehole model do not conform to the first velocity value and the second radial distance predicted by the noise log borehole model, the PNL borehole model (706) and/or the noise log borehole model (726) are updated, as at 712. The gas saturation, the first and second radial distances, and the first velocity value are recalculated based on an updated PNL borehole model (706) and/or noise log borehole model (726).

If the gas saturation and the first radial distance predicted by the PNL borehole model conform to the first velocity value and the second radial distance predicted by the noise log borehole model, a first result is obtained, as at 714. The first result includes the radial distance of the one or more flow paths in the wellbore 102 and the velocity of the gas flow in the one or more flow paths.

At 742, a Doppler log is obtained from the Doppler sensor 124*c* (FIG. 1) and, at 744, Doppler data including an amplitude and frequency information of the modified acoustic wave, and the frequency shift between the emitted acoustic wave and the modified acoustic wave is obtained (e.g., via deconvolution) from the Doppler log. As at 745, the method 700 provides the Doppler data to the Doppler borehole model, which is obtained at 746. The Doppler borehole model may be similar to the model 500 illustrated in FIG. 5, and, when provided with the Doppler data, the Doppler borehole model determines a third radial distance of the one or more flow paths from center of the wellbore 102 and a second velocity value of the gas flow in the one or more flow paths, as at 748.

At 730, the third radial distance and the second velocity value are compared with the radial distance and velocity value from the first result obtained at 714. If the difference therebetween is greater than a predetermined value (e.g., determined based on a standard deviation), the PNL borehole model (706), the noise log borehole model (726) and/or the Doppler borehole model (746) are updated, as at 732. The predictions from an updated PNL borehole model (706), noise log borehole model (726) and/or Doppler borehole model (746) are then recalculated.

If the difference is less than or equal to the predetermined value, a second result is obtained, as at 734. The second result includes the radial distance of the one or more flow paths in the wellbore 102 and the velocity of gas flow in the one or more flow paths.

At 762, a temperature profile is obtained from the temperature sensor 124*d* (FIG. 1) and, at 764, temperature data including the temperature value at a given depth (e.g., the amplitude of the temperature profile at a given time), the temperature gradient (the rate of increase in temperature with depth), and a derivative of the temperature profile is obtained (e.g., via deconvolution) from the temperature data. As at 770, data from a static borehole model is obtained and a temperature borehole model is created, as at 766. This temperature borehole model may be similar to the temperature borehole model described above, and when provided with the temperature data, as at 765, the temperature borehole model 766 determines a fourth radial distance of the one or more flow paths from center of the wellbore 102 and a third velocity value of the gas flow in the one or more flow paths, as at 768.

At 750, the fourth radial distance and the third velocity value are compared with the radial distances and velocity values from the second result obtained at 734. If the difference therebetween is greater than a predetermined value, the PNL borehole model (706), the noise log borehole model (726), the Doppler borehole model (746), and/or the temperature borehole model (766) are updated, as at 752. The predictions from the updated model(s) PNL borehole model (706), noise log borehole model (726), Doppler borehole model (746), and/or the temperature borehole model (766) are recalculated.

If the difference is less than or equal to the predetermined value, the widths of the flow paths at the cement interfaces, the velocity of the gas flow in each of the flow paths, and the radial distance to the gas flow are obtained, as at 754.

Figure 8:
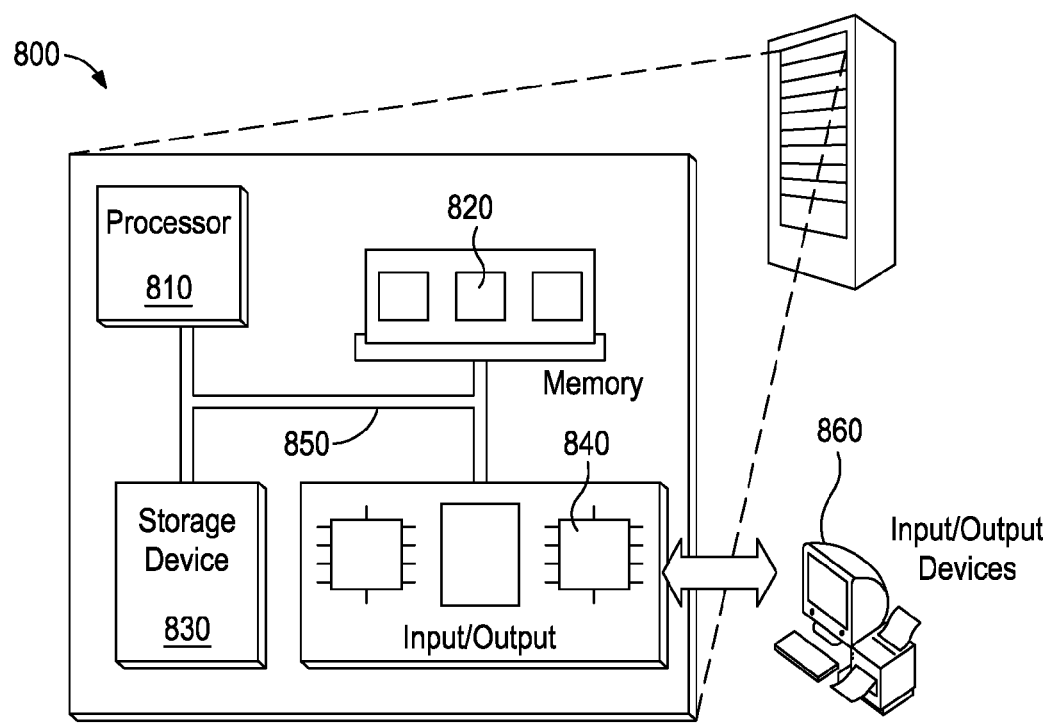
FIG. 8 illustrates an exemplary processing system for determining the presence of a gas flow in a wellbore.

FIG. 8 illustrates an exemplary processing system 800 for determining the presence of a gas flow in a wellbore. For instance, the system 800 may process data received from the one or more sensors 124*a*-*d* located on the tool string 114 in FIG. 1, control the operation of the tool string 114, and may implement the exemplary integrated workflow method 700 disclosed above.

The system 800 may include a processor 810, a memory 820, a storage device 830, and an input/output device 840. Each of the components 810, 820, 830, and 840 may be interconnected, for example, using a system bus 850. The processor 810 may be processing instructions for execution within the system 800. In some embodiments, the processor 810 is a single-threaded processor, a multi-threaded processor, or another type of processor. The processor 810 may be capable of processing instructions stored in the memory 820 or on the storage device 830. The memory 820 and the storage device 830 can store information within the computer system 800.

The input/output device 840 may provide input/output operations for the system 800. In some embodiments, the input/output device 840 can include one or more network interface devices, e.g., an Ethernet card; a serial communication device, e.g., an RS-232 port; and/or a wireless interface device, e.g., an 802.11 card, a 3G wireless modem, or a 4G wireless modem. In some embodiments, the input/output device can include driver devices configured to receive input data and send output data to other input/output devices, e.g., keyboard, printer and display devices 860. In some embodiments, mobile computing devices, mobile communication devices, and other devices can be used.

In accordance with at least some embodiments, the disclosed methods and systems related to scanning and analyzing material may be implemented in digital electronic circuitry, or in computer software, firmware, or hardware, including the structures disclosed in this specification and their structural equivalents, or in combinations of one or more of them. Computer software may include, for example, one or more modules of instructions, encoded on computer-readable storage medium for execution by, or to control the operation of, a data processing apparatus. Examples of a computer-readable storage medium include non-transitory medium such as random access memory (RAM) devices, read only memory (ROM) devices, optical devices (e.g., CDs or DVDs), and disk drives.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing, and grid computing infrastructures.

A computer program (also known as a program, software, software application, script, or code) can be written in any form of programming language, including compiled or interpreted languages, declarative, or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be executed on one computer or on multiple computers that are located at one site or distributed across multiple sites and interconnected by a communication network.

Some of the processes and logic flows described in this specification may be performed by one or more programmable processors executing one or more computer programs to perform actions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors and processors of any kind of digital computer. Generally, a processor will receive instructions and data from a read-only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer may not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD-ROM and DVD-ROM disks. The processor and the memory can be supplemented by, or incorporated in, special purpose logic circuitry.

To provide for interaction with a user, operations may be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

Embodiments disclosed herein include:

A: A method that includes introducing a tool string into a wellbore at least partially lined with a first casing and a second casing concentrically overlapping a portion of the first casing, wherein a first annulus is defined between the first and second casings and filled with a first cement, and a second annulus is defined between the second casing and the wellbore and filled with a second cement, obtaining data from a pulsed neutron sensor, a noise sensor, a Doppler sensor, and a temperature sensor, all included in the tool string, determining a gas presence in a flow path located at a cement interface in the wellbore and a first distance of the flow path from the tool string using a pulsed neutron log borehole model and the data obtained from the pulsed neutron sensor, calculating a second distance of the flow path from the tool string and a first velocity of a gas flow in the flow path using a noise log borehole model and the data obtained from the noise sensor, correlating the first distance and the gas presence with the second distance and the first velocity to obtain a first calculated distance of the flow path and a first calculated velocity of the gas flow in the flow path, calculating a third distance of the flow path from the tool string and a second velocity of the gas flow in the flow path using a Doppler borehole model and the data obtained from the Doppler sensor, comparing the third distance and the second velocity with the first calculated distance and first calculated velocity, respectively, to obtain a second calculated distance of the flow path and a second calculated velocity of the gas flow in the flow path, calculating a fourth distance of the flow path from the tool string and a third velocity of the gas flow in the flow path using a temperature borehole model and the data obtained from the temperature sensor, and comparing the fourth distance and the third velocity with the second calculated distance and the second calculated velocity, respectively, to determine a width of the cement interface, a distance of the cement interface from the tool string, and a velocity of a gas flow in the cement interface.

B: A well system includes comprising a tool string conveyable into a wellbore drilled through one or more subterranean formations and at least partially lined with a first casing and a second casing concentrically overlapping a portion of the first casing, wherein a first annulus is defined between the first and second casings and filled with a first cement, a second annulus is defined between the second casing and the wellbore and filled with a second cement, and the tool string includes at least a pulsed neutron sensor, a noise sensor, a Doppler sensor, and a temperature sensor, and a computer system including a processor and a non-transitory computer readable medium, the computer system communicatively coupled to the tool string, and the computer readable medium stores a computer readable program code, when executed by the processor, configures the processor to operate the pulsed neutron sensor to obtain pulsed neutron log (PNL) data from the wellbore, determine a gas presence in a flow path located at a cement interface in the wellbore and a first distance of the flow path from the tool string using a pulsed neutron log borehole model and the PNL data, operate the noise sensor to obtain noise log (NL) data from the wellbore, calculate a second distance of the flow path from the tool string and a first velocity of the gas flow in the flow path using a noise log borehole model and the NL data, correlate the first distance and the gas presence with the second distance and the first velocity to obtain a first calculated distance of the flow path and a first calculated velocity of the gas flow in the flow path, operate the Doppler sensor to obtain Doppler log (DL) data from the wellbore, calculate a third distance of the flow path from the tool string and a second velocity of the gas flow in the flow path using a Doppler borehole model and the DL data, compare the third distance the first calculated distance to obtain a second calculated distance of the flow path and compare the second velocity with and first calculated velocity to obtain a second calculated velocity of the gas flow in the flow path, operate the temperature sensor to obtain temperature data from the wellbore, calculate a fourth distance of the flow path from the tool string and a third velocity of the gas flow in the flow path using a temperature borehole model and the temperature data, and compare the fourth distance and the third velocity with the second calculated distance and the second calculated velocity, respectively, to determine a width of the cement interface, a distance of the cement interface from the tool string, and a velocity of a gas flow in the cement interface.

Each of embodiments A and B may have one or more of the following additional elements in any combination: Element 1: wherein obtaining data from the pulsed neutron sensor comprises obtaining an amount of gas saturation in the flow path. Element 2: wherein obtaining data from the noise sensor comprises one or more of obtaining amplitudes of noise signals detected by the noise sensor from the wellbore, obtaining a frequency spectrum of the noise signals, obtaining a relative phase shift between the noise signals, obtaining frequency ratios of near and far noise signals, and obtaining power spectral density of the noise signals. Element 3: wherein obtaining data from the Doppler sensor comprises one or more of obtaining an amplitude and frequency information of an acoustic wave as modified by the wellbore, and obtaining a frequency shift between an acoustic wave emitted by the Doppler sensor into the wellbore and the modified acoustic wave. Element 4: obtaining data from the temperature sensor comprises one or more of obtaining a temperature of the wellbore, obtaining a temperature gradient of the wellbore, and obtaining a derivative of a temperature profile of the wellbore. Element 5: further comprising updating at least one of the pulsed neutron log borehole model and the noise log borehole model when the gas presence in the flow path, the first distance of the flow path, the second distance of the flow path, and the first velocity of the gas flow do not conform with each other. Element 6: further comprising recalculating one or more of the gas presence in the flow path, the first distance of the flow path, the second distance of the flow path, and the first velocity of the gas flow using a corresponding updated model. Element 7: further comprising updating one or more of the pulsed neutron log borehole model, the noise log borehole model, and the Doppler borehole model when a difference between the first calculated distance and the third distance and a difference between the first calculated velocity and the second velocity is greater than a predetermined value. Element 8: further comprising recalculating one or more of the gas presence in the flow path, the first distance of the flow path, the second distance of the flow path, the first velocity of the gas flow, the third distance of the flow path, and the second velocity of the gas flow using a corresponding updated model. Element 9: further comprising updating one or more of the pulsed neutron log borehole model, the noise log borehole model, the Doppler borehole model, and the temperature borehole model when a difference between the second calculated distance and the fourth distance and a difference between the second calculated velocity and the third velocity is greater than a predetermined value. Element 10: further comprising recalculating one or more of the gas presence in the flow path, the first distance of the flow path, the second distance of the flow path, the first velocity of the gas flow, the third distance of the flow path, the second velocity of the gas flow, the fourth distance of the flow path, and the third velocity of the gas flow using a corresponding updated model. Element 11: further comprising obtaining the temperature borehole model from a static borehole model.

Element 12: wherein the processor is further configured to update at least one of the pulsed neutron log borehole model and the noise log borehole model when the gas presence in the flow path, the first distance of the flow path, the second distance of the flow path, and the first velocity of the gas flow do not conform with each other. Element 13: wherein the processor is further configured to recalculate one or more of the gas presence in the flow path, the first distance of the flow path, the second distance of the flow path, and the first velocity of the gas flow using a corresponding updated model. Element 14: wherein the processor is further configured to update one or more of the pulsed neutron log borehole model, the noise log borehole model, and the Doppler borehole model when a difference between the first calculated distance and the third distance and a difference between the first calculated velocity and the second velocity is greater than a predetermined value. Element 15: wherein the processor is further configured to recalculate one or more of the gas presence in the flow path, the first distance of the flow path, the second distance of the flow path, the first velocity of the gas flow, the third distance of the flow path, and the second velocity of the gas flow using a corresponding updated model. Element 16: wherein the processor is further configured to update one or more of the pulsed neutron log borehole model, the noise log borehole model, the Doppler borehole model, and the temperature borehole model when a difference between the second calculated distance and the fourth distance and a difference between the second calculated velocity and the third velocity is greater than a predetermined value. Element 17: wherein the processor is further configured to recalculate one or more of the gas presence in the flow path, the first distance of the flow path, the second distance of the flow path, the first velocity of the gas flow, the third distance of the flow path, the second velocity of the gas flow, the fourth distance of the flow path, and the third velocity of the gas flow using a corresponding updated model.

By way of non-limiting example, exemplary combinations applicable to A and B include: Element 5 with Element 6; Element 7 with Element 8; Element 9 with Element 10; Element 12 with Element 13; Element 14 with Element 15; and Element 16 with Element 17.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:

1. A method, comprising:
    introducing a tool string into a wellbore, the wellbore at least partially lined with a first casing and a second casing concentrically overlapping a portion of the first casing, wherein a first annulus is defined between the first and second casings and filled with a first cement, and a second annulus is defined between the second casing and the wellbore and filled with a second cement;
    obtaining data from a pulsed neutron sensor, a noise sensor, a Doppler sensor, and a temperature sensor, all included in the tool string;
    determining a gas presence in a flow path located at a cement interface in the wellbore and a first distance of the flow path from the tool string using a pulsed neutron log borehole model and the data obtained from the pulsed neutron sensor;
    calculating a second distance of the flow path from the tool string and a first velocity of a gas flow in the flow path using a noise log borehole model and the data obtained from the noise sensor;
    correlating the first distance and the gas presence with the second distance and the first velocity to obtain a first calculated distance of the flow path and a first calculated velocity of the gas flow in the flow path;
    calculating a third distance of the flow path from the tool string and a second velocity of the gas flow in the flow path using a Doppler borehole model and the data obtained from the Doppler sensor;
    comparing the third distance and the second velocity with the first calculated distance and first calculated velocity, respectively, to obtain a second calculated distance of the flow path and a second calculated velocity of the gas flow in the flow path;
    calculating a fourth distance of the flow path from the tool string and a third velocity of the gas flow in the flow path using a temperature borehole model and the data obtained from the temperature sensor; and comparing the fourth distance and the third velocity with the second calculated distance and the second calculated velocity, respectively, to determine a width of the cement interface, a distance of the cement interface from the tool string, and a velocity of a gas flow in the cement interface.

2. The method of claim 1, wherein obtaining data from the pulsed neutron sensor comprises obtaining an amount of gas saturation in the flow path.

3. The method of claim 1, wherein obtaining data from the noise sensor comprises one or more of obtaining amplitudes of noise signals detected by the noise sensor from the wellbore, obtaining a frequency spectrum of the noise signals, obtaining a relative phase shift between the noise signals, obtaining frequency ratios of near and far noise signals, and obtaining power spectral density of the noise signals.

4. The method of claim 1, wherein obtaining data from the Doppler sensor comprises one or more of obtaining an amplitude and frequency information of an acoustic wave as modified by the wellbore, and obtaining a frequency shift between an acoustic wave emitted by the Doppler sensor into the wellbore and the modified acoustic wave.

5. The method of claim 1, obtaining data from the temperature sensor comprises one or more of obtaining a temperature of the wellbore, obtaining a temperature gradient of the wellbore, and obtaining a derivative of a temperature profile of the wellbore.

6. The method of claim 1, further comprising updating at least one of the pulsed neutron log borehole model and the noise log borehole model when the gas presence in the flow path, the first distance of the flow path, the second distance of the flow path, and the first velocity of the gas flow do not conform with each other.

7. The method of claim 6, further comprising recalculating one or more of the gas presence in the flow path, the first distance of the flow path, the second distance of the flow path, and the first velocity of the gas flow using a corresponding updated model.

8. The method of claim 1, further comprising updating one or more of the pulsed neutron log borehole model, the noise log borehole model, and the Doppler borehole model when a difference between the first calculated distance and the third distance and a difference between the first calculated velocity and the second velocity is greater than a predetermined value.

9. The method of claim 8, further comprising recalculating one or more of the gas presence in the flow path, the first distance of the flow path, the second distance of the flow path, the first velocity of the gas flow, the third distance of the flow path, and the second velocity of the gas flow using a corresponding updated model.

10. The method of claim 1, further comprising updating one or more of the pulsed neutron log borehole model, the noise log borehole model, the Doppler borehole model, and the temperature borehole model when a difference between the second calculated distance and the fourth distance and a difference between the second calculated velocity and the third velocity is greater than a predetermined value.

11. The method of claim 10, further comprising recalculating one or more of the gas presence in the flow path, the first distance of the flow path, the second distance of the flow path, the first velocity of the gas flow, the third distance of the flow path, the second velocity of the gas flow, the fourth distance of the flow path, and the third velocity of the gas flow using a corresponding updated model.

12. The method of claim 1, further comprising obtaining the temperature borehole model from a static borehole model.

13. A well system, comprising:
a tool string conveyable into a wellbore drilled through one or more subterranean formations, wherein the wellbore is at least partially lined with a first casing and a second casing concentrically overlapping a portion of the first casing, and wherein a first annulus is defined between the first and second casings and filled with a first cement, a second annulus is defined between the second casing and the wellbore and filled with a second cement, and the tool string includes at least a pulsed neutron sensor, a noise sensor, a Doppler sensor, and a temperature sensor; and
a computer system including a processor and a non-transitory computer readable medium, the computer system communicatively coupled to the tool string, and the computer readable medium stores a computer readable program code, when executed by the processor, configures the processor to:
operate the pulsed neutron sensor to obtain pulsed neutron log (PNL) data from the wellbore;
determine a gas presence in a flow path located at a cement interface in the wellbore and a first distance of the flow path from the tool string using a pulsed neutron log borehole model and the PNL data;
operate the noise sensor to obtain noise log (NL) data from the wellbore;
calculate a second distance of the flow path from the tool string and a first velocity of the gas flow in the flow path using a noise log borehole model and the NL data;
correlate the first distance and the gas presence with the second distance and the first velocity to obtain a first calculated distance of the flow path and a first calculated velocity of the gas flow in the flow path;
operate the Doppler sensor to obtain Doppler log (DL) data from the wellbore;
calculate a third distance of the flow path from the tool string and a second velocity of the gas flow in the flow path using a Doppler borehole model and the DL data;
compare the third distance with the first calculated distance to obtain a second calculated distance of the flow path and compare the second velocity and the first calculated velocity to obtain a second calculated velocity of the gas flow in the flow path;
operate the temperature sensor to obtain temperature data from the wellbore;
calculate a fourth distance of the flow path from the tool string and a third velocity of the gas flow in the flow path using a temperature borehole model and the temperature data; and
compare the fourth distance and the third velocity with the second calculated distance and the second calculated velocity, respectively, to determine a width of the cement interface, a distance of the cement interface from the tool string, and a velocity of a gas flow in the cement interface.

14. The system of claim 13, wherein the processor is further configured to update at least one of the pulsed neutron log borehole model and the noise log borehole model when the gas presence in the flow path, the first distance of the flow path, the second distance of the flow path, and the first velocity of the gas flow do not conform with each other.

15. The system of claim 14, wherein the processor is further configured to recalculate one or more of the gas presence in the flow path, the first distance of the flow path, the second distance of the flow path, and the first velocity of the gas flow using a corresponding updated model.

16. The system of claim 13, wherein the processor is further configured to update one or more of the pulsed neutron log borehole model, the noise log borehole model, and the Doppler borehole model when a difference between the first calculated distance and the third distance and a difference between the first calculated velocity and the second velocity is greater than a predetermined value.

17. The system of claim 16, wherein the processor is further configured to recalculate one or more of the gas presence in the flow path, the first distance of the flow path, the second distance of the flow path, the first velocity of the gas flow, the third distance of the flow path, and the second velocity of the gas flow using a corresponding updated model.

18. The system of claim 13, wherein the processor is further configured to update one or more of the pulsed neutron log borehole model, the noise log borehole model, the Doppler borehole model, and the temperature borehole model when a difference between the second calculated distance and the fourth distance and a difference between the second calculated velocity and the third velocity is greater than a predetermined value.

19. The system of claim 18, wherein the processor is further configured to recalculate one or more of the gas presence in the flow path, the first distance of the flow path, the second distance of the flow path, the first velocity of the gas flow, the third distance of the flow path, the second velocity of the gas flow, the fourth distance of the flow path, and the third velocity of the gas flow using a corresponding updated model.

* * * * *

UNITED STATES PATENT AND TRADEMARK OFFICE
CERTIFICATE OF CORRECTION

PATENT NO. : 9,547,105 B2  
APPLICATION NO. : 15/111622  
DATED : January 17, 2017  
INVENTOR(S) : Luis F. Quintero Page 1 of 1

It is certified that error appears in the above-identified patent and that said Letters Patent is hereby corrected as shown below:

On the Title Page

Item (73) Assignee should read --Halliburton Energy Services, Inc.-- rather than "Halliburton Energy Sevices, Inc."

Signed and Sealed this
Seventeenth Day of October, 2017

Joseph Matal
*Performing the Functions and Duties of the*
*Under Secretary of Commerce for Intellectual Property and*
*Director of the United States Patent and Trademark Office*